(12) United States Patent
Li et al.

(10) Patent No.: US 12,306,020 B1
(45) Date of Patent: May 20, 2025

(54) MAGNETOSTRICTIVE DISPLACEMENT SENSOR CALIBRATION METHOD, SYSTEM, DEVICE, AND STORAGE MEDIUM

(71) Applicant: GUANGDONG RUNYU SENSOR CO., LTD, Guangdong (CN)

(72) Inventors: Haiquan Li, Guangdong (CN); Bingzhu Lin, Guangdong (CN); Huaxiang Zhang, Guangdong (CN)

(73) Assignee: GUANGDONG RUNYU SENSOR CO., LTD, Guangdong (CN)

( * ) Notice: Subject to any disclaimer, the term of this patent is extended or adjusted under 35 U.S.C. 154(b) by 0 days.

(21) Appl. No.: 18/850,693

(22) PCT Filed: Apr. 15, 2024

(86) PCT No.: PCT/CN2024/087746
§ 371 (c)(1),
(2) Date: Jan. 7, 2025

(87) PCT Pub. No.: WO2024/230413
PCT Pub. Date: Nov. 14, 2024

(30) Foreign Application Priority Data

May 5, 2023 (CN) .......................... 202310495636.7

(51) Int. Cl.
*G01D 18/00* (2006.01)
*G01B 11/14* (2006.01)
*G01D 5/16* (2006.01)

(52) U.S. Cl.
CPC .......... *G01D 18/001* (2021.05); *G01B 11/14* (2013.01); *G01D 5/16* (2013.01)

(58) Field of Classification Search
CPC ........ G01D 18/001; G01D 5/16; G01D 18/00; G01D 18/002; G01D 18/008;
(Continued)

(56) References Cited

U.S. PATENT DOCUMENTS 7,463,021 B2 * 12/2008 Steinich ............... G01D 11/245
324/207.13
2018/0335352 A1 * 11/2018 Lu ............................ G01D 5/24
(Continued)

FOREIGN PATENT DOCUMENTS

| CN | 101561244 | 10/2009 |
| CN | 102435264 | 5/2012 |

(Continued)

OTHER PUBLICATIONS

WIPO, International Search Report for PCT/CN2024/087746, Jun. 20, 2024.
(Continued)

*Primary Examiner* — Alvaro E Fortich
(74) *Attorney, Agent, or Firm* — Hodgson Russ LLP

(57) ABSTRACT

A magnetostrictive displacement sensor calibration method obtains all sub-ranges after a range of the magnetostrictive displacement sensor is segmented, and a start moment and an end moment of each sub-range to obtain a time region of each sub-range; and calculates to obtain a calibration speed of the target sub-range based on a target start moment, a target end moment and a target sub-range of the target time region; and then determines a target time region of a current moment, and can calculate a first displacement on the target sub-range based on the calibration speed, the current moment and the target start moment; and accumulates the first displacement with all sub-ranges before the target sub-range to obtain a displacement of the current moment.

17 Claims, 4 Drawing Sheets

(58) Field of Classification Search
CPC ...... G01D 18/004; G01D 18/006; G01D 5/00;
G01D 5/12; G01D 5/14; G01D 5/142;
G01D 5/165; G01D 5/18; G01D 5/183;
G01D 5/125; G01B 11/14; G01B 11/00;
G01B 11/02; G01B 11/002
See application file for complete search history.

(56) References Cited

U.S. PATENT DOCUMENTS

| | | | | |
|---|---|---|---|---|
| 2019/0017851 | A1* | 1/2019 | Zern | G01D 5/485 |
| 2019/0212218 | A1* | 7/2019 | Lu | G01L 3/105 |
| 2020/0025594 | A1* | 1/2020 | Kántor | G01D 5/485 |

FOREIGN PATENT DOCUMENTS

| | | |
|---|---|---|
| CN | 103808767 | 5/2014 |
| CN | 104154851 | 11/2014 |
| CN | 206362300 | 7/2017 |
| CN | 207730308 | 8/2018 |
| CN | 109253744 | 1/2019 |
| CN | 109357610 | 2/2019 |
| CN | 208968466 | 6/2019 |
| CN | 110081806 | 8/2019 |
| CN | 210625568 | 5/2020 |
| CN | 111307174 | 6/2020 |
| CN | 115727929 | 3/2023 |
| CN | 116026217 | 4/2023 |
| CN | 116202408 | 6/2023 |
| RU | 2584577 | 5/2016 |

OTHER PUBLICATIONS

CNIPA, First Office Action for CN Application No. 202310495636.7, Jun. 10, 2023.

CNIPA, Notification to Grant Patent Right for Invention for CN Application No. 202310495636.7, Jun. 19, 2023.

* cited by examiner

MAGNETOSTRICTIVE DISPLACEMENT SENSOR CALIBRATION METHOD, SYSTEM, DEVICE, AND STORAGE MEDIUM

CROSS-REFERENCE TO RELATED APPLICATIONS

This application is a national stage entry under 37 U.S.C. § 371 of International Application No. PCT/CN2024/087746, filed Apr. 15, 2024, which claims priority to Chinese Patent Application No. 202310495636.7, filed May 5, 2023, the entire disclosures of which is hereby incorporated herein by reference.

TECHNICAL FIELD

The present application relates to the field of sensor technology, particularly to a magnetostrictive displacement sensor calibration method, system, device and storage medium.

BACKGROUND

Currently, during the use of magnetostrictive displacement sensors for displacement measurement, due to the limitation of production process of the waveguide wire, there are differences between the transmission speeds of the mechanical waves in the whole waveguide wire, these differences will directly affect the measurement accuracy of magnetostrictive displacement sensors. Due to the magnetostrictive displacement sensor in the working process subjected to affection caused by factors such as the temperature, waveguide wire tension and long-term loading of high-current interrogation pulse, etc., the wave speed of the waveguide wire and a return signal will change, the measurement value of the sensors will appear obvious drift, that is, low measurement accuracy.

SUMMARY

There are provided a magnetostrictive displacement sensor calibration method, system, device, and storage medium according to embodiments of the present disclosure. The technical solution is as below.

According to a first aspect of the embodiments of the present application, it provides a magnetostrictive displacement sensor calibration method, which includes:
  obtaining all sub-ranges after a range of the magnetostrictive displacement sensor is segmented;
  obtaining a start moment and an end moment of each sub-range to obtain a time region of each sub-range;
  determining a target time region of a current moment, and calculating to obtain a calibration speed of the target sub-range based on a target start moment, a target end moment and a target sub-range of the target time region;
  calculating a first displacement on the target sub-range based on the calibration speed, the current moment and the target start moment; and
  accumulating the first displacement with all sub-ranges before the target sub-range to obtain a displacement of the current moment.

According to a second aspect of the embodiments of the present application, it provides a magnetostrictive displacement sensor calibration system, which includes a magnetostrictive displacement sensor, a microprocessor, a laser interferometer, an upper computer and a time converter;
  the upper computer is connected to the laser interferometer and the microprocessor, the magnetostrictive displacement sensor is connected to the time converter, and the time converter is connected to the microprocessor;
  the laser interferometer is configured for performing displacement marking during range segmentation of the magnetostrictive displacement sensor;
  the upper computer is configured for reading an amount of displacement marking of the laser interferometer to obtain each sub-range and writing each sub-range into the microprocessor;
  the time converter is configured for marking the start moment and the end moment of each sub-range based on instructions to start timing sent by the microprocessor;
  the microprocessor is configured for:
  obtaining all sub-ranges after a range of the magnetostrictive displacement sensor is segmented;
  obtaining a start moment and an end moment of each sub-range to obtain a time region of each sub-range;
  determining a target time region of a current moment, and calculating to obtain a calibration speed of the target sub-range based on a target start moment, a target end moment and a target sub-range of the target time region;
  calculating a first displacement on the target sub-range based on the calibration speed, the current moment and the target start moment; and
  accumulating the first displacement with all sub-ranges before the target sub-range to obtain a displacement of the current moment.

According to a third aspect of the embodiments of the present application, it provides a calibration device, including a memory and a processor, the memory stores a computer program, and the processor, when executing the computer program, implements the method according to any one of embodiments as mentioned above.

According to a fourth aspect of the embodiments of the present application, it provides a computer-readable storage medium, on which computer-readable instructions are stored, the computer-readable instructions, when executed by a processor of a computer, cause the computer to implement the method according to any one of embodiments as mentioned above.

In the technical solution provided in embodiments of the present application, after a range of the magnetostrictive displacement sensor is segmented, each sub-range and the start moment and the end moment of each sub-range are obtained, to obtain a time region of each sub-range, so that the calibration speed of each sub-range can be obtained based on the displacement length of each sub-range and the start moment and the end moment of each sub-range. Then a target time region of the current moment is determined, a first displacement on the target sub-range can be calculated based on the calibration speed of the target sub-range of the target time region, and then the first displacement is summed up with all the sub-ranges before the target sub-range, to obtain an accurate displacement of the current moment. The calibration speed of each sub-range can be obtained by segmentation, so that the accuracy of the measurement can be improved.

Other features and advantages of the present application will become apparent by the following detailed description, or will be acquired in part by practice of the present application.

It should be understood that the above general description and the detailed description that follows are merely exemplary and do not limit the present application.

BRIEF DESCRIPTION OF THE DRAWINGS

The accompanying drawings herein, which are incorporated into and form a part of the specification, illustrate embodiments consistent with the present application and are used in conjunction with the specification to explain the principles of the present application.

The foregoing and other objects, features, and advantages of the present application will become more apparent by describing the exemplary embodiments thereof in detail with reference to the accompanying drawings.

Figure 1:
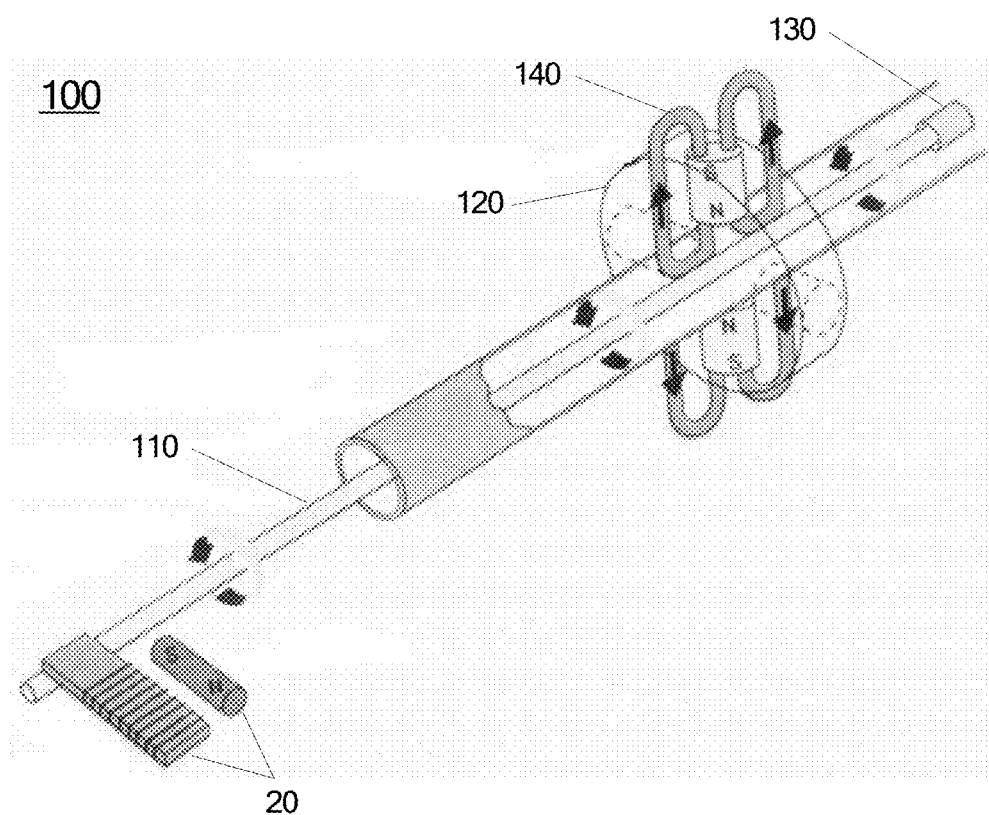
FIG. 1 is a structure view of a magnetostrictive displacement sensor provided in the related art.

By means of the above accompanying drawings, definite embodiments of the present application are shown, which will be described in more detail later, and these accompanying drawings and descriptions are not intended to limit in any way the scope of the present application, but rather to illustrate the concepts of the present application for those skilled in the art by reference to particular embodiments.

DETAILED DESCRIPTION OF THE EMBODIMENTS

Embodiments will now be described more fully with reference to the accompanying drawings. However, the embodiments can be implemented in a variety of forms and should not be construed as limitation to the examples set forth herein; rather, these embodiments allow that the description of the present application will be more comprehensive and complete and that the idea of the embodiments will be fully communicated to those skilled in the art. The accompanying drawings are only schematic illustrations of the present application and are not necessarily to scale. Identical accompanying symbols in the drawings indicate identical or similar parts, and thus repetitive descriptions of them will be omitted.

In addition, the features, structures, or characteristics described may be combined in one or more embodiments in any suitable manner. In the following description, many specific details are provided thereby giving a full understanding of the embodiments of the present application. However, those skilled in the art will realize that it is possible to practice the technical embodiments of the present application and omit one or more of the particular details described, or that other methods, groups of elements, steps, etc. may be employed. In other cases, well-known structures, methods, implementations, or operations are not shown or described in detail to avoid overshadowing and obscuring aspects of the present application.

Some of the block diagrams shown in the accompanying drawings are functional entities that do not necessarily have to correspond to physically or logically separate entities. These functional entities may be implemented in software form, or in one or more hardware modules or integrated circuits, or in different networks and/or processor devices and/or microprocessor devices.

A magnetostrictive displacement sensor is composed of the positive magnetostrictive effect and the inverse magnetostrictive effect of a ferromagnetic material. The magnetostrictive displacement sensor establishes a correspondence between the time and the displacement by converting a physical quantity of displacement into a time interval of two pulse signals, and has the advantages of high measurement accuracy, large measurement range, and simple structure, and is widely used in the fields of motion detection of hydraulic cylinders, motion detection of machine tools, etc.

Referring to FIG. 1, FIG. 1 is a structure view of a magnetostrictive displacement sensor provided in the related art. As shown in FIG. 1, the magnetostrictive displacement sensor 100 mainly consists of a waveguide wire 110, a measuring rod 120, an electronic warehouse 130, and a non-contact magnetic ring 140 (with permanent magnets inside) provided on the measuring rod 120. When the magnetostrictive displacement sensor 100 operates, the electronic circuit in the electronic warehouse 130 generates a start pulse, and the start pulse is transmitted in the magnetostrictive wire (i.e., the waveguide wire 110), and generates a rotating magnetic field that advances in a direction of the waveguide wire 110. When the rotating magnetic field meets with a permanent magnetic field in the magnetic ring, a magnetostrictive effect is generated, which causes the waveguide wire 110 to be twisted to produce a strain mechanical pulse with a fixed speed V. The pulse is sensed by the energy pickup mechanism 20 mounted in the electronic warehouse 130 and converted into a corresponding current pulse (termination pulse), and the time difference T between the two pulses is calculated by the electronic circuit, so that the measured displacement can be measured.

However, due to the limitation of the production process of the waveguide wire, there are differences between the transmission speeds of the mechanical waves in the whole waveguide wire, these differences will directly affect the measurement accuracy of magnetostrictive displacement sensors. Due to the magnetostrictive displacement sensor in the working process subjected to affection caused by factors such as the temperature, waveguide wire tension and long-term loading of high-current interrogation pulse, etc., the wave speed of the waveguide wire and a return signal will change, the measurement value of the sensors will appear obvious drift, that is, low measurement accuracy.

Based on this, the present application proposes a magnetostrictive displacement sensor calibration method, the range of the magnetostrictive displacement sensor is segmented, such that the calibration speed of each sub-range can be obtained, and then the displacement can be calculated based on the calibration speed, which can improve the measurement accuracy.

Figure 2:
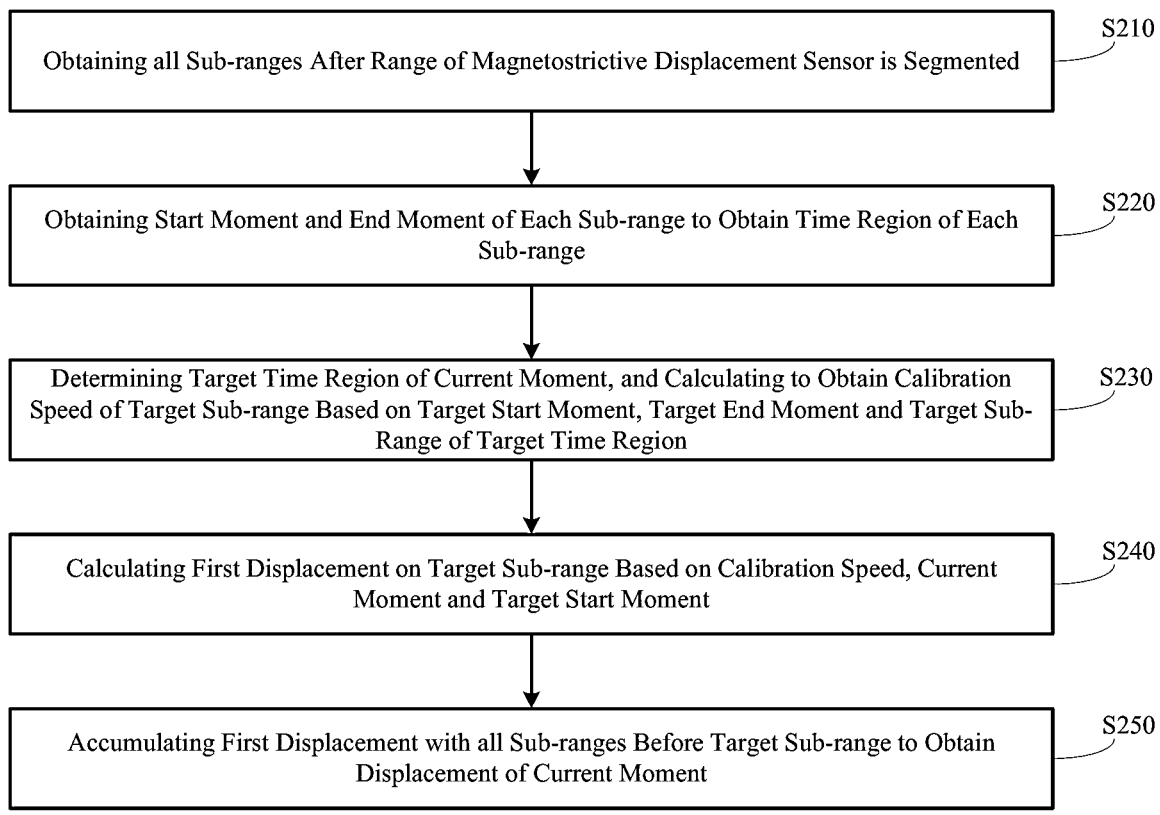
FIG. 2 is a flowchart of a magnetostrictive displacement sensor calibration method provided by embodiments of the present application.

Referring to FIG. 2, FIG. 2 is a flowchart of a magnetostrictive displacement sensor calibration method provided by embodiments of the present application, which is performed by a microprocessor, including, but not limited to, steps S210 to S250.

Step S210, obtaining all sub-ranges after a range of the magnetostrictive displacement sensor is segmented.

In embodiments of the present application, the microprocessor is connected to the magnetostrictive displacement sensor, so that the microprocessor can be used to calibrate the magnetostrictive displacement sensor. The microprocessor needs to first obtain the sub-ranges after the range of the magnetostrictive displacement sensor is segmented, which specifically can be written into the microprocessor by the upper computer.

Step S220, obtaining a start moment and an end moment of each sub-range to obtain a time region of each sub-range.

In the embodiment of the present application, during obtaining each sub-range after the range of the magnetostrictive displacement sensor is segmented, the microprocessor also needs to correspondingly obtain the start moment and the end moment of each sub-range, so as to obtain a time region of each sub-range.

Step S230, determining a target time region of a current moment, and calculating to obtain a calibration speed of the target sub-range based on a target start moment, a target end moment and a target sub-range of the target time region.

In the embodiment of the present application, after the range of the magnetostrictive displacement sensor is segmented, and each sub-range and the start moment and the end moment of the each sub-range are obtained, the calibration speed of each sub-range can be calculated. However, the embodiment of the present application does not calculate the calibration speed of each sub-range, but determines a target time region of the current moment, to determine the calibration speed of the target sub-range to be calculated. That is, by determining the target time region of the current moment, only the calibration speed of the target sub-range needs to be calculated, which reduces the amount of calculation and improves the calculation efficiency.

Exemplarily, the target time region of the current moment T is determined to be $T_1$ to $T_2$, and the target sub-range of the target time region $T_1$ to $T_2$ is $L_1$, the target start moment of the target time region $T_1$ to $T_2$ is $T_1$, and the target end moment of the target time region $T_1$ to $T_2$ is $T_2$, so that the calibration speed can be calculated based on the target sub-range $L_1$, the target start moment $T_1$, and the target end moment $T_2$.

The microprocessor of the embodiment of the present application needs to first obtain each sub-range and the start moment and the end moment of each sub-range after the range of the magnetostrictive displacement sensor is segmented, so that the calibration speed of each sub-range can be calculated based on the displacement length of each sub-range and the start moment and the end moment of each sub-range.

It should be noted that the displacement length of each sub-range may be the same or different. Exemplarily, for a magnetostrictive displacement sensor with a larger range, the front portion of the range may be coarsely divided, i.e., the displacement lengths of the sub-ranges of the front portion are longer. The rear portion of the range is subdivided, i.e. displacement lengths of the sub-ranges of the rear portion are shorter. In this way, the calculation efficiency can be improved while ensuring the accuracy of the calibration speed of each sub-range.

Step S240, calculating a first displacement on the target sub-range based on the calibration speed, the current moment and the target start moment.

In an embodiment of the present application, after the calibration speed of the target sub-range is calculated, the first displacement on the target sub-range may be calculated based on the calibration speed, the current moment, and the target start moment.

Exemplarily, the target time region of the current moment T is $T_1$ to $T_2$, the target sub-range of the target time region $T_1$ to $T_2$ is $L_1$, the target start moment is $T_1$, and the target end moment is $T_2$, and the calibration speed VT is calculated based on the target sub-range $L_1$, the target start moment $T_1$, and the target end moment $T_2$. At this time, the calibration speed VT can be regarded as the accurate moving speed on the target sub-range $L_1$. Based on the current moment and the target start moment, a moving time of the non-contact magnetic ring of the magnetostrictive displacement sensor on the target sub-range $L_1$ can be calculated, so that a first displacement of the non-contact magnetic ring moving on the target sub-range $L_1$ can be calculated based on the calibration speed VT and the moving time.

It is to be understood that although the first displacement is obtained based on the current moment, the first displacement is not the total displacement of the current moment, but it is only the movement distance on the target sub-range.

Step S250, accumulating the first displacement with all sub-ranges before the target sub-range to obtain a displacement of the current moment.

In the embodiment of the present application, since the first displacement is a movement distance on the target sub-range, in order to calculate the total displacement of the current moment, it is necessary to accumulate the first displacement with all sub-ranges before the target sub-range to obtain the displacement of the current moment.

In the embodiment of the present application, the microprocessor first obtains each sub-range after the range of the magnetostrictive displacement sensor is segmented, and the start comment and the end moment of each sub-range. Then, after the target time region of the current moment is determined, the calibration speed of the target sub-range is calculated based on the target sub-range, the target start moment and the target end moment of the target time region. The displacement may then be calculated based on the calibration speed, which can improve the measurement accuracy. Moreover, during the calculation of the total displacement, only the first displacement on the target sub-range is calculated based on the calibration speed, and all the sub-ranges before the target sub-range are marked during segmentation, the marks are not calculated based on the difference between the speed and the time, so as to make the total displacement less affected by the speed, and to further ensure the measurement accuracy of the magnetostrictive displacement sensor.

By calibrating the algorithm of speed, the embodiments of the present application can reduce the differences in the transmission speed of the mechanical wave on the waveguide wire and the differences introduced by signal attenuation, thus measurement accuracy of the product is improved. Another advantage of the algorithm is to maintain the response speed of the product, and the calculation of the subdivided calibration speed can be saved in the random access memory (RAM) of the microprocessor, and each time before calculating the displacement output, the current time is determined to be within the target time region of which subdivided time, and then the displacement output of the whole region is calculated with the corresponding calibration speed.

The algorithm of the calibration speed can be applied in the temperature compensation of the product, due to change of the temperature, the signal of the product also shows different degrees of attenuation, using the algorithm of the calibration speed can also improve the temperature drift performance of the product.

Figure 3:
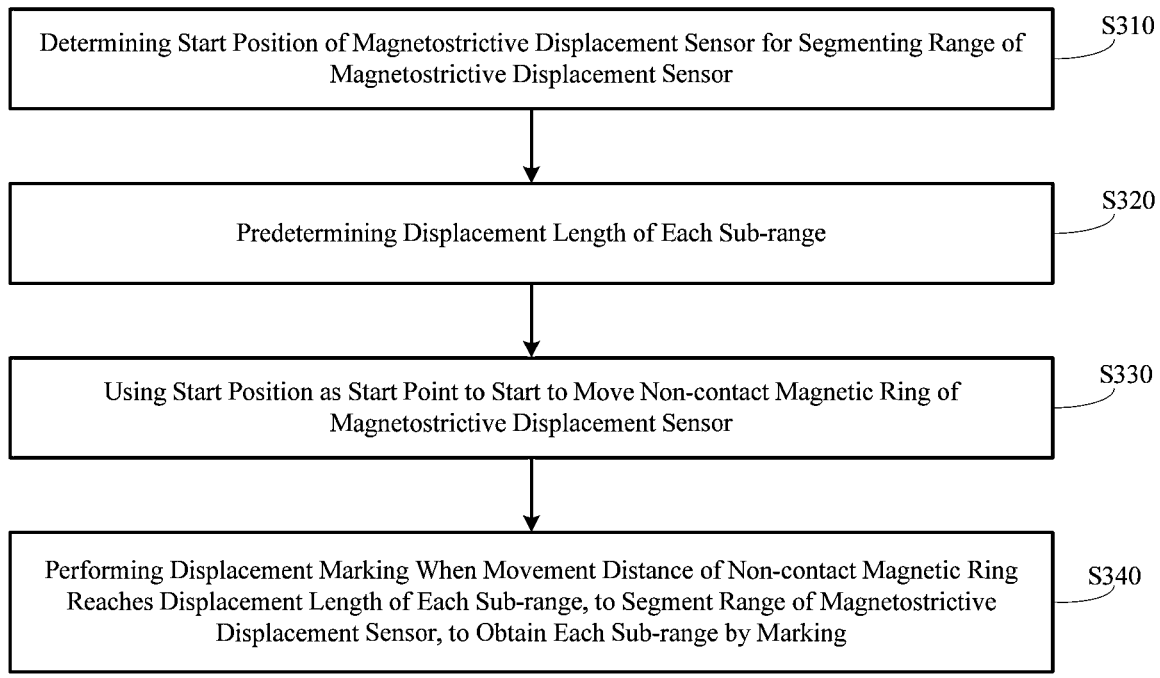
FIG. 3 is a flowchart of obtaining each sub-range after a range of the magnetostrictive displacement sensor is segmented provided by embodiments of the present application.

In one embodiment of the present application, referring to FIG. 3, FIG. 3 is a flowchart of obtaining each sub-range after the range of the magnetostrictive displacement sensor is segmented provided by an embodiment of the present application, which is performed by a microprocessor, including, but not limited to, steps S310 to step S330.

Step S310, determining a start position of the magnetostrictive displacement sensor for segmenting the range of the magnetostrictive displacement sensor.

In the embodiment of the present application, a start position for segmenting the range of the magnetostrictive displacement sensor is first determined, and a zero position of the range is generally used as the start position to segment the range.

It is to be noted that the embodiments of the present application do not specifically limit the start position for segmenting the range of the magnetostrictive displacement sensor, which may be the zero position of the range or any position in the range.

It is understood that, in order to ensure that the range can be effectively segmented, a position close to the fullness position in the range is generally not taken as the start position for segmenting the range.

It is to be understood that the start position when marking needs to be the same as the start position when subsequently performing the measurement.

Step S320, predetermining a displacement length of each sub-range.

Figure 4:
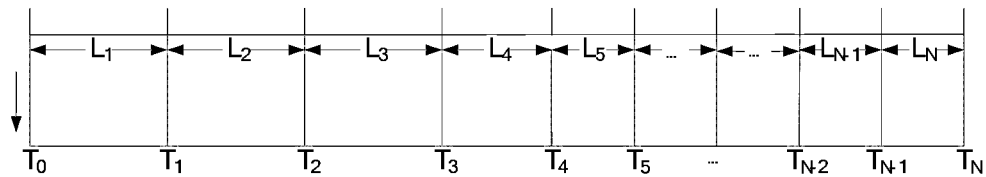
FIG. 4 is a schematic diagram of markings after the range of the magnetostrictive displacement sensor is segmented provided by embodiments of the present application.

In the embodiment of the present application, the displacement length of each sub-range needs to be clarified first. That is, it is necessary to predetermine how many segments the range is divided into, and how much the displacement length of each segment is, respectively. Exemplarily, with reference to FIG. 4, FIG. 4 is a schematic diagram of marking after the range of the magnetostrictive displacement sensor is segmented provided in an embodiment of the present application. As shown in FIG. 4, the range of the magnetostrictive displacement sensor is divided into N segments, $L_1$, $L_2$, and $L_3$ . . . $L_N$. $L_1$, $L_2$, and $L_3$ . . . , $L_N$ are consecutive sub-ranges. The sub-range $L_1$ can be named as the first sub-range, the sub-range $L_2$ can be named as the second sub-range, the sub-range $L_3$ can be named as the third sub-range, and the sub-range $L_N$ can be named as the Nth sub-range. The displacement length of the sub-range $L_1$ is $L_1$, the displacement length of the sub-range $L_2$ is $L_2$, the displacement length of the sub-range $L_3$ is $L_3$, and the displacement length of the sub-range $L_N$ is $L_N$.

Step S330, using the start position as a start point to start to move a non-contact magnetic ring of the magnetostrictive displacement sensor.

In the embodiment of the present application, after the start position is determined, the non-contact magnetic ring of the magnetostrictive displacement sensor starts to move with the start position as the start point, so that the range segment can be marked by measuring the displacement of the non-contact magnetic ring.

Step S340, performing displacement marking when a movement distance of the non-contact magnetic ring reaches the displacement length of each sub-range, to segment the range of the magnetostrictive displacement sensor, to obtain each sub-range by marking.

In the embodiment of the present application, taking the start position as the start point, the non-contact magnetic ring of the magnetostrictive displacement sensor is moved, and the displacement marking is performed when the movement distance of the non-contact magnetic ring reaches the displacement length of each sub-range, to segment the range of the magnetostrictive displacement sensor, to obtain each sub-range by marking.

Exemplarily, the displacement length of the first sub-range is predetermined to be $L_1$, and when the laser interferometer detects that the non-contacting magnetic ring is moved by distance $L_1$ from the start position 0, i.e., when it is moved from the position 0 to the position $L_1$, the movement distance $L_1$ is marked as the first sub-range, marked as $L_1$. When the non-contact magnetic ring continues to be moved, and when the non-contact magnetic ring is moved from position $L_1$ to position $L_1+L_2$, the movement distance $L_2$ is marked as the second sub-range, marked as $L_2$. In this manner, when the non-contact magnetic ring continues to be moved by the movement distance $L_N$, the movement distance $L_N$ is marked as an Nth sub-range, marked as $L_N$.

It is to be understood that $L_1$, $L_2$, . . . , $L_N$ correspond to the displacement length of each sub-range, their corresponding values may be all equal, may be all unequal, or may be partially equal.

The embodiment of the present application may measure the displacement length of each sub-range by the laser interferometer, or may determine, by the laser interferometer, the movement distance to be controlled of each small segment of the non-contact magnetic ring. Thereby, the upper computer may read the data from the laser interferometer to obtain each sub-range after the range of the magnetostrictive displacement sensor is segmented. The upper computer may also mark the corresponding displacement of each sub-range and write it to the microprocessor, so that the microprocessor obtains the marked sub-ranges.

The embodiment of the present application obtains each sub-range with a mark by segmenting and marking the range of the magnetostrictive displacement sensor, and during marking, the corresponding moments can be marked at the same time, such that the start moment and the end moment of each sub-range can be obtained.

Figure 5:
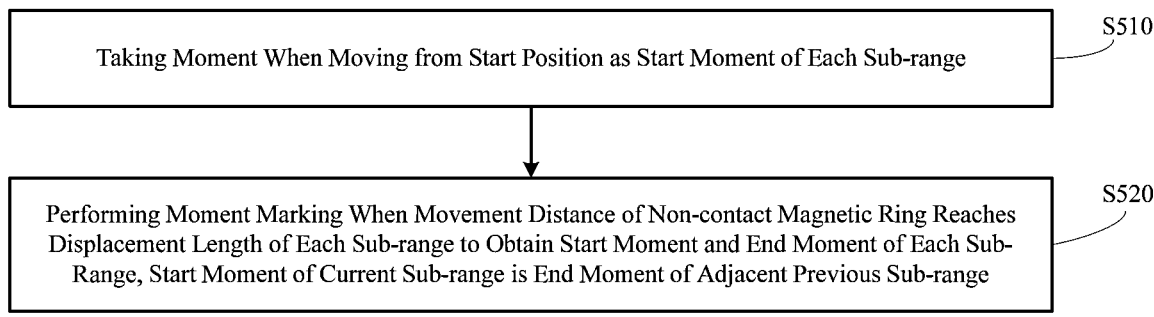
FIG. 5 is a flowchart of obtaining the start moment and the end moment of each sub-range provided by embodiments of the present application.

In an embodiment of the present application, referring to FIG. 5, FIG. 5 is a flowchart of obtaining the start comment and the end moment of each sub-range provided in the embodiment of the present application, which is executed by the microprocessor, including but not limited to steps S510 to S520.

Step S510, taking a moment when moving from the start position as the start moment of each sub-range.

In the embodiment of the present application, the moment when moving from the start position is used as the start moment. For example, if the zero position 0 of the range is taken as the start position, the moment when the non-contact magnetic ring starts to move from the zero position 0 is the start moment, which can be marked as $T_0$.

It should be noted that the start moment is the instantaneous moment when the non-contact magnetic ring starts to move from the zero position 0. That is, at the instant when the non-contact magnetic ring starts to move from the zero position 0, the microprocessor sends an instruction to start timing to the time converter, at this time, the start moment may be defaulted to be 0. It is to be understood that the start moment may also not be defaulted to be 0.

Step S520, performing moment marking when the movement distance of the non-contact magnetic ring reaches the displacement length of each sub-range to obtain the start moment and end moment of each sub-range, a start moment of a current sub-range is an end moment of an adjacent previous sub-range.

In the embodiment of the present application, when the movement distance of the non-contact magnetic ring reaches the displacement length of each sub-range, the magnetostrictive displacement sensor may send a pulse signal to the time converter, so that the time converter may output the corresponding time value according to the pulse signal, and the start comment and the end moment of each sub-range may be marked. The time converter may send the start moment and the end moment of each marked sub-range to the microprocessor.

Exemplarily, referring to FIG. 4, at the instant when the non-contact magnetic ring starts to move from the start position 0, the microprocessor sends an instruction to start timing to the time converter, so that the time converter may start timing based on the instruction. When the laser interferometer detects that the non-contact magnetic ring is moved by a distance $L_1$ from the start position 0, i.e., when it is moved from the position 0 to the position $L_1$, the magnetostrictive displacement sensor sends a pulse signal to the time converter. At this time, the time converter can correspondingly output time $T_1$ based on the pulse signal. The non-contact magnetic ring continues to be moved, when the non-contact magnetic ring is moved from the position $L_1$ to the position $L_2$, that is, when it is moved from the position $L_1$ to the position $L_1+L_2$, the magnetostrictive displacement sensor will send a pulse signal to the time converter. At this time, the time converter outputs time $T_2$ based on the pulse signal. In this manner, when the non-contact magnetic ring continues to be moved by the distance $L_N$, the magnetostrictive displacement sensor sends a pulse signal to the time converter. At this time, the time converter can output the time $T_N$ based on the pulse signal.

It is understood that the start moment of the first sub-range $L_1$ is $T_0$ and the end moment of the first sub-range $L_1$ is $T_1$. The start moment of the second sub-range $L_2$ is $T_1$, which is the end moment of the first sub-range $L_1$, and the end moment of the second sub-range $L_2$ is $T_2$. The start moment of the Nth sub-range $L_N$ is $T_{N-1}$ and the end moment of the Nth sub-range $L_N$ is $T_N$.

It can be understood that the start moment and the end moment of each sub-range are time values outputted by the time converter according to the received pulse signals after timing is started. Thus, the values of $T_1, T_2, \ldots T_N$ should increase gradually. For example, $T_0$ is 0s, $T_1$ is 10s, $T_2$ is 20s, $T_3$ is 30s, $T_4$ is 40s, and $T_5$ is 45s. In other words, the time converter actually outputs the time difference, that is, when the non-contact magnetic ring is moved by a distance $L_1$ from the start position, it costs 10s. Since $T_0$ is 0s, so that the end moment of the first sub-range $L_1$ is 10s. When the non-contact magnetic ring continues to be moved by the distance $L_2$, it also costs 10s, but since the time converter does not end the timing after the timing is started, thus the time will be accumulated all the time during the movement of the non-contact magnetic ring, and thus the corresponding output $T_2$ is 20s, which is the cumulative time when the non-contact magnetic ring is moved by the distances $L_1$ and $L_2$ from starting the timing.

It will be appreciated that during marking, the non-contact magnetic ring is moved continuously from the start position to the fullness position of the range. There is no stopping action during this movement.

In the embodiment of the present application, by obtaining each sub-range and the start moment and the end moment of each sub-range after the range of the magnetostrictive displacement sensor is segmented, the microprocessor can calculate the calibration speed of each sub-range based on the displacement length of each sub-range and the start moment and the end moment of each sub-range. By obtaining the calibration speed of each sub-range, the measurement accuracy of the magnetostrictive displacement sensor can be improved.

Figure 6:
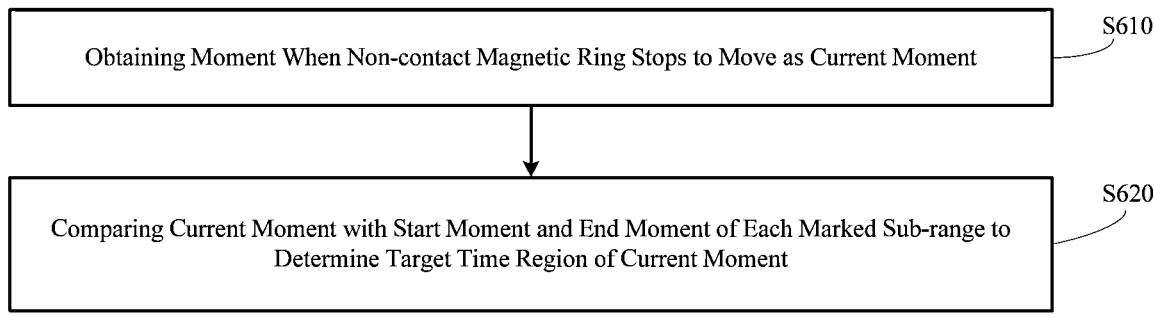
FIG. 6 is a flowchart of determining a target time region of a current moment provided by embodiments of the present application.

In one embodiment of the present application, referring to FIG. 6, FIG. 6 is a flowchart of determining a target time region of the current moment provided by an embodiment of the present application, which is executed by the microprocessor, including but not limited to steps S610 to S620.

Step S610, obtaining a moment when the non-contact magnetic ring stops to move as the current moment.

In the embodiment of the present application, after the range of the magnetostrictive displacement sensor is segmented, and each sub-range and the start moment and the end moment of each sub-range are marked, the magnetostrictive displacement sensor may be mounted to the object which needs the positioning measurement. At this time, the non-contact magnetic ring of the magnetostrictive displacement sensor is moved together with the object. Thus, when the object stops to move, the non-contacting magnetic ring also stops to move. At this time, the magnetostrictive displacement sensor may send a pulse signal to the time converter, so that the time converter may correspondingly output a time value to the microprocessor, and at this time, the time value received by the microprocessor is the current moment.

Step S620, comparing the current moment with the start moment and the end moment of each marked sub-range to determine the target time region of the current moment.

After receiving the time value of the current moment, the microprocessor may compare the time value of the current moment with the start moment and the end moment of the each marked sub-range to determine the target time region of the current moment. For example, if it can be determined after comparison that the current moment T is between $T_1$ and $T_2$, the time region $T_1$ to $T_2$ of the current moment can be determined.

Exemplarily, a time value of the current moment obtained by the microprocessor is 35s. By comparing the start moment and the end moment of each marked sub-range, it is found that 35s is in the time region 30s to 40s. The sub-range of the time region 30s to 40s is the fourth sub-range, marked as $L_4$, the start moment of the fourth sub-range is 30s, and the end moment of the fourth sub-range is 40s.

It is to be understood that the current moment may also be an arbitrarily specified moment during the object being started to move and the timing being started, so that the target time region of the arbitrarily specified moment may be determined.

By determining the target time region of the current moment, the embodiment of the present application can determine the target sub-range of the target time region, so that only the calibration speed of the target sub-range can be calculated. The amount of arithmetic can be reduced and the measurement efficiency can be improved.

In one embodiment of the present application, after the target time region of the current moment is determined, the calibration speed of the target sub-range may be calculated according to the target start moment, the target end moment and the target sub-range of the target time region. Specifically, the calibration speed of the target time region may be calculated by a formula (1) as shown below:

$$V_N = \frac{L_N}{T_N - T_{N-1}};\qquad(1)$$

In formula (1), $V_N$ denotes a calibration speed of a Nth target time region, $L_N$ denotes a displacement length of a Nth target sub-range, $T_N$ denotes an end moment of the Nth target time region, and $T_{N-1}$ denotes a start moment of the Nth target time region.

Exemplarily, with reference to FIG. 4, when a current moment obtained by the the microprocessor is 35s, by comparing the current moment with the start moment and the end moment of each sub-range, it is found that 35s is in the time region 30s to 40s, and the sub-range of the time region 30s to 40s is the fourth sub-range, and the displacement length $L_4$ is 100 cm, so that the calibration speed of the fourth sub-range $$V_4 = \frac{L_4}{T_4 - T_3} = \frac{100}{40 - 30} = 10 \text{ cm/s}$$

can be calculated by the formula (1).

In an embodiment of the present application, the calculation of the calibration speed further includes:

segmenting the range of the magnetostrictive displacement sensor to obtain N sub-ranges, respectively $L_1$, $L_2$, $L_3$, ..., $L_N$. $L_1$, $L_2$, $L_3$, ..., $L_N$ are consecutive sub-ranges. Then the start moment and end moment of each sub-range are obtained to obtain the time region of each sub-range. Specifically, for example, a start moment of the sub-range $L_1$ is $T_0$ and an end moment of the sub-range $L_1$ is $T_1$, a start moment of the sub-range $L_2$ is $T_1$ and an end moment of the sub-range $L_2$ is $T_2$, and a start moment of the sub-range $L_N$ is $T_{N-1}$ and an end moment of the sub-range $L_N$ is $T_N$. At this time, when the current moment T belongs to the time region $T_{N-1}$ to $T_N$, a total displacement $W_{N-1}$ at the moment $T_{N-1}$ is calculated based on a standard speed $V_b$, and a total displacement $W_N$ at the current moment $T_N$ is calculated based on the standard speed $V_b$, then a calculated displacement $W_N$ to $W_{N-1}$ of the time region $T_{N-1}$ to $T_N$ can be calculated based on the total displacement $W_{N-1}$ at the moment $T_{N-1}$ and the total displacement $W_N$ at the moment $T_N$. And then a calibration coefficient $$\lambda_N = \frac{L_N}{W_N - W_{N-1}}$$

of the Nth sub-range can be calculated based on the calculated displacement $W_N$ to $W_{N-1}$ of the time region $T_{N-1}$ to $T_N$ and an actual displacement, which is the displacement length $L_N$ of the Nth sub-range. Thus, the standard speed $V_b$ can be calibrated based on the calibration coefficient $\lambda_N$ of the Nth sub-range to obtain the calibration speed $$V_N = \lambda_N * V_b = \frac{L_N}{W_N - W_{N-1}} * V_b$$

of the Nth sub-range.

It is to be noted that the standard speed $V_b$ is determined by the range of the magnetostrictive displacement sensor, i.e., different ranges correspond to different standard speeds $V_b$.

It will be appreciated that the standard speed $V_b$ of the magnetostrictive displacement sensor may be pre-written to the microprocessor by the upper computer.

The embodiments of the present application may improve the diversity of the ways of obtaining the calibration speed by providing another way of obtaining the calibration speed. Different ways of calculating the calibration speed may also be adopted based on different situations, and a comparison of the two calibration speeds may be used to determine whether the calculation result of one of the adopted calibration speeds is incorrect, which may further ensure the measurement accuracy.

In an embodiment of the present application, after calculating the calibration speed of the target sub-range, the first displacement on the target sub-range may be calculated based on the calibration speed, the current moment and the target start moment. Specifically, the first displacement on the target sub-range may be calculated by the formula (2) as shown below:

$$S_N = V_N *(T - T_{N-1})\qquad(2);$$

In the formula (2), $S_N$ denotes the first displacement in the Nth target sub-range, $V_N$ denotes the calibration speed of the Nth target sub-range, $T_{N-1}$ denotes the start moment of the Nth target time region, and T denotes a current moment of the Nth target time region.

Exemplarily, when a current moment obtained by the the microprocessor is 35s, by comparing the current moment with the start moment and the end moment of each sub-range, it is found that 35s is in the time region 30s to 40s, and the sub-range of the time region 30s to 40s is the fourth sub-range, and the displacement length $L_4$ is 100 cm, so that the calibration speed $$V_4 = \frac{L_4}{T_4 - T_3} = \frac{100}{40 - 30} = 10 \text{ cm/s}$$

of the fourth sub-range can be calculated by the formula (1). The first displacement $S_4 = V_4 *(T - T_3) = V_4 *(35 - 30)$ on the fourth sub-range can then be further calculated based on the calibration speed $V_4$, the current moment 35s and the start moment 30s of the fourth sub-range.

In an embodiment of the present application, after calculating the first displacement on the target sub-range, it is necessary to accumulate the first displacement with the sub-ranges of all time regions before the target time region, and the obtained total displacement is the displacement of the current moment. Specifically, the displacement of the current moment can be calculated by the formula (3) as shown below:

$$S = S_N + \text{SUM}(L_{N-1})\qquad(3);$$

S denotes the displacement of the current moment, $S_N$ denotes the first displacement on the Nth target sub-range, and $\text{SUM}(L_{N-1})$ denotes a sum of lengths of all sub-ranges before the Nth target sub-range, $\text{SUM}(L_{N-1}) = L_1 + L_2 + \ldots L_{N-2} + L_{N-1}$.

Exemplarily, a current moment obtained by the microprocessor is 35s, and by comparing the current moment with the start moment and the end moment of each sub-range, it is found that 35s is in the time region 30s to 40s. The sub-range of the time region 30s to 40s is the fourth sub-range. The first displacement on the fourth sub-range is $S_4$. The first sub-range, the second sub-range, and the third sub-range are included before the fourth sub-range. The displacement length of the first sub-range is $L_1$, the displacement length of the second sub-range is $L_2$, and the displacement length of the third sub-range is $L_3$, such that the displacement of the current moment can be calculated as $S=S_4+SUM(L_3)=S_4+L_1+L_2+L_3$.

It is understood that since the current moment can also be an arbitrarily specified moment during the object being started to move and the timing being started, that is, the embodiment of the present application can also calculate the displacement of any moment during the object moving, that is, the displacement of the object can be obtained in real time by the magnetostrictive displacement sensor, and the real-time trajectory of the object can be obtained to be able to accurately locate the object and track the trajectory of the object.

Figure 7:
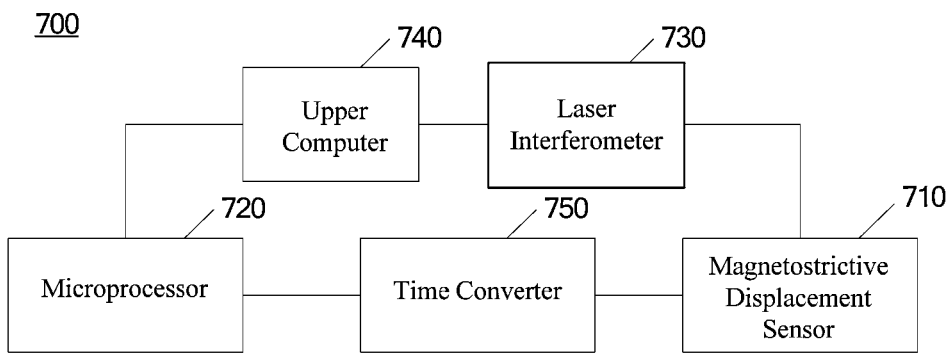
FIG. 7 is a schematic diagram of a magnetostrictive displacement sensor calibration system provided by embodiments of the present application.

Referring to FIG. 7, FIG. 7 is a schematic diagram of a magnetostrictive displacement sensor calibration system provided by an embodiment of the present application. As shown in FIG. 7, the embodiment of the present application also provides a magnetostrictive displacement sensor calibration system 700, which includes a magnetostrictive displacement sensor 710, a microprocessor 720, a laser interferometer 730, an upper computer 740, and a time converter 750. The upper computer 740 is connected to the laser interferometer 730 and the microprocessor 720, the magnetostrictive displacement sensor 710 is connected to the time converter 750, and the time converter 750 is connected to the microprocessor 720.

The laser interferometer 730 is configured for performing displacement marking during range segmentation of the magnetostrictive displacement sensor 710.

The upper computer 740 is configured for reading an amount of displacement marking of the laser interferometer 730 to obtain each sub-range and write each sub-range into the microprocessor 720.

The time converter 750 is configured for marking the start moment and the end moment of each sub-range based on instructions to start timing sent by the microprocessor 720.

The microprocessor 720 is configured for:
 obtaining all sub-ranges after a range of the magnetostrictive displacement sensor 710 is segmented;
 obtaining a start moment and an end moment of each sub-range to obtain a time region of each sub-range;
 determining a target time region of a current moment, and calculating to obtain a calibration speed of the target sub-range based on a target start moment, a target end moment and a target sub-range of the target time region;
 calculating a first displacement on the target sub-range based on the calibration speed, the current moment and the target start moment; and
 accumulating the first displacement with all sub-ranges before the target sub-range to obtain a displacement of the current moment.

The specific implementation of the magnetostrictive displacement sensor calibration system is basically the same as the specific implementation of the magnetostrictive displacement sensor calibration method as described above, and will not be repeated herein.

Embodiments of the present application also provide a calibration device, the calibration device includes a memory and a processor, the memory stores a computer program, and the processor implements the above magnetostrictive displacement sensor calibration method when executing the computer program.

Figure 8:
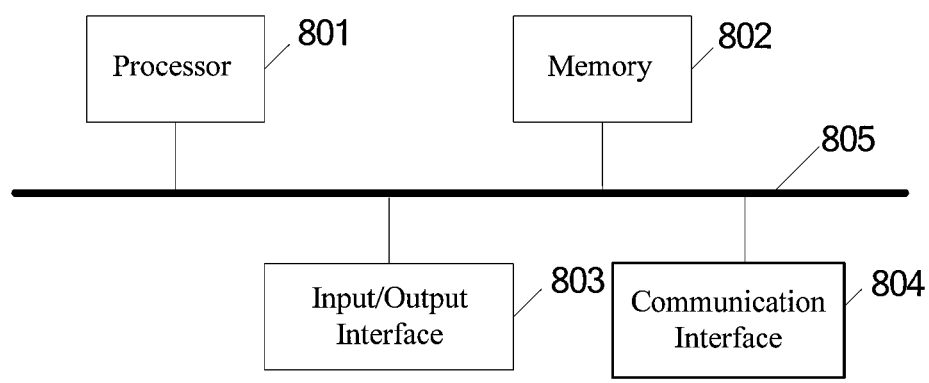
FIG. 8 is a structure block view of a calibration device provided by embodiments of the present application.

Referring to FIG. 8, which illustrates a hardware structure of a calibration device of another embodiment, the calibration device includes:

a processor 801, which may be implemented by a general central processing unit (CPU), a microprocessor, an application specific integrated circuit (ASIC), or one or more integrated circuits for executing a relevant program, to realize the technical solutions provided in the embodiments of the present application.

A memory 802, which may be realized in the form of a read only memory (ROM), a static storage device, a dynamic storage device, or a RAM. The memory 802 may store an operating system and other application programs, and when realizing the technical solutions provided in the embodiments of this specification through software or firmware, the relevant program code is stored in the memory 802 and called by the processor 801 to execute the magnetostrictive displacement sensor calibration method of the embodiments of the present application.

An input/output interface 803 for realizing information input and output.

A communication interface 804, for realizing communication interaction between the present device and other devices, which can be realized by wired means (e.g., USB, network cable, etc.) or by wireless means (e.g., mobile network, WIFI, Bluetooth, etc.);

A bus 805, which transmits information between various components of the device (e.g., a processor 801, a memory 802, an input/output interface 803, and a communication interface 804).

The processor 801, the memory 802, the input/output interface 803, and the communication interface 804 realize a communication connection therebetween within the device via the bus 805.

Embodiments of the present application also provide a storage medium, the storage medium is a computer-readable storage medium, the storage medium stores a computer program, the computer program is executed by the processor to implement the above magnetostrictive displacement sensor calibration method.

The memory, a non-transitory computer-readable storage medium, may be used to store non-transitory software programs and non-transitory computer-executable programs. In addition, the memory may include a high-speed random access memory, and may also include a non-transitory memory, such as at least one disk memory device, a flash memory device, or other non-transitory solid state memory device. In some implementations, the memory may optionally include memories remotely located with respect to the processor, and these remote memories may be connected to the processor via a network. Examples of the networks include, but are not limited to, the internet, an enterprise intranet, a local area network, a mobile communication network, and combinations thereof.

The embodiments described herein are for the purpose of more clearly illustrating the technical solutions of the embodiments of the present application, and do not constitute a limitation of the technical solutions provided by the embodiments of the present application, and it is understood by those skilled in the art that, with the evolution of the technology and the emergence of new application scenarios, the technical solutions provided by the embodiments of the present application are equally applicable to similar technical problems.

It is understood by those skilled in the art that the technical solutions illustrated in the drawings do not constitute a limitation of the embodiments of the present application, and may include more or fewer steps than illustrated, or a combination of certain steps, or different steps.

The above embodiments of the device are merely schematic, the units illustrated as separated components may or may not be physically separated, i.e., they may be located in one place, or they may also be distributed over a plurality of network units. Some or all of these modules may be selected to realize the purpose of the embodiment scheme according to actual needs.

It will be understood by those skilled in the art that all or some of the steps, systems, functional modules/units in the device of the method disclosed above may be implemented as software, firmware, hardware and suitable combinations thereof.

The terms "first", "second", "third", "fourth", etc. (if any) in the specification of the present application and the above drawings are used to distinguish between similar objects and needn't be used to describe a particular order or sequence. It should be understood that the data so used may be interchangeable, where appropriate, so that the embodiments of the present application described herein can be implemented in an order other than those illustrated or described herein. In addition, the terms "comprising" and "having", and any variations thereof, are intended to cover non-exclusive embodiments, e.g., a process, method, system, product, or device including a series of steps or units need not be limited to those steps or units clearly listed, but may include other steps or units that are not clearly listed or are inherent to those processes, methods, products or devices.

It should be understood that, in the present application, "at least one (item)" means one or more, and "more than one" means two or more. "and/or" is used to describe an associated relationship of the associated objects, indicating that three types of relationships may exist, for example, 'A and/or B' may indicate that only A, only B, and both A and B. A, B may be singular or plural. The character "/" generally indicates an "or" relationship. The expression "at least one (one) of the following" or its equivalent refers to any combination of these items, including any combination of singular (one) or plural (one) items. For example, at least one of the items (ones) a, b, or c, may be expressed as: a, b, c, "a and b", "a and c", "b and c", or "a and b and c", a, b, c may be single or multiple.

In the several embodiments provided in the present application, it should be understood that the devices and methods disclosed, may be realized in other ways. For example, the device embodiments described above are merely schematic, e.g., the division of the units described above, is merely a logical functional division, and the actual implementation may be divided in other ways, e.g., a plurality of units or components may be combined or may be integrated into another system, or some features may be ignored, or not implemented. At another point, the coupling or direct coupling or communication connection between each other shown or discussed may be an indirect coupling or communication connection through some interface, device or unit, which may be in the form of electrical, mechanical or other.

The units illustrated above as separated components may or may not be physically separated, and the components shown as units may or may not be physical units, i.e., they may be located in a single place or they may be distributed to a plurality of network units. Some or all of these units may be selected to realize the purpose of the embodiment scheme according to actual needs.

In addition, the various functional units in various embodiments of the present application may be integrated in a single processing unit, or each unit may be physically present separately, or two or more units may be integrated in a single unit. The above integrated units may be realized either in the form of hardware or in the form of software functional units.

The integrated unit may be stored in a computer-readable storage medium if it is realized in the form of a software functional unit and sold or used as a separate product. Based on this understanding, the technical solution of the present application may be embodied in the form of a software product that is essentially or in part a contribution to the related art, or all or part of the technical solution may be embodied in the form of a software product that is stored in a storage medium and includes a plurality of instructions to cause a computer device (which may be a personal computer, a server, or a network device, etc.) to perform all or a portion of the steps of the method of the various embodiments of the present application. The aforementioned storage medium include a USB flash drive, a removable hard disk, a ROM, a RAM, a diskette, a CD-ROM, and other media that can store a program.

The above description of the preferred embodiments of the embodiments of the present application with reference to the accompanying drawings is not intended to limit the scope of the embodiments of the present application. Any modifications, equivalent substitutions, or improvements made by those skilled in the art without departing from the scope and substance of the embodiments of the present application shall be within the scope of the embodiments of the present application.

What is claimed is:

1. A magnetostrictive displacement sensor calibration method, comprising:
    obtaining all sub-ranges after a range of a magnetostrictive displacement sensor is segmented;
    obtaining a start moment and an end moment of each sub-range to obtain a time region of each sub-range;
    determining a target time region of a current moment, and calculating to obtain a calibration speed of a target sub-range based on a target start moment, a target end moment and a target sub-range of the target time region;
    calculating a first displacement on the target sub-range based on the calibration speed, the current moment and the target start moment; and
    accumulating the first displacement with all sub-ranges before the target sub-range to obtain a displacement of the current moment;
    wherein obtaining all the sub-ranges after the range of the magnetostrictive displacement sensor is segmented comprises:
        determining a start position of the magnetostrictive displacement sensor for segmenting the range of the magnetostrictive displacement sensor;
        predetermining a displacement length of each sub-range;
        using the start position as a start point to start to move a non-contact magnetic ring of the magnetostrictive displacement sensor; and
        performing displacement marking when a movement distance of the non-contact magnetic ring reaches the displacement length of each sub-range, to segment the range of the magnetostrictive displacement sensor, to obtain each sub-range by marking.

2. The magnetostrictive displacement sensor calibration method according to claim 1, wherein obtaining the start moment and the end moment of each sub-range comprises:
    taking a moment when moving from the start position as the start moment of each sub-range; and performing moment marking when the movement distance of the non-contact magnetic ring reaches the displacement length of each sub-range to obtain the start moment and end moment of each sub-range, wherein a start moment of a current sub-range is an end moment of an adjacent previous sub-range.

3. The magnetostrictive displacement sensor calibration method according to claim 1, wherein determining the target time region of the current moment comprises:
obtaining a moment when the non-contact magnetic ring stops to move as the current moment; and
comparing the current moment with the start moment and the end moment of each marked sub-range to determine the target time region of the current moment.

4. The magnetostrictive displacement sensor calibration method according to claim 1, wherein calculating to obtain the calibration speed of the target sub-range based on the target start moment, the target end moment and the target sub-range of the target time region is performed by a following formula:

$$V_N = \frac{L_N}{T_N - T_{N-1}};$$

wherein, $V_N$ denotes a calibration speed of a Nth target time region, $L_N$ denotes a displacement length of a Nth target sub-range, $T_N$ denotes an end moment of the Nth target time region, and $T_{N-1}$ denotes a start moment of the Nth target time region.

5. The magnetostrictive displacement sensor calibration method according to claim 4, wherein calculating the first displacement on the target sub-range based on the calibration speed, the current moment and the target start moment is performed by a following formula:

$$S_N = V_N*(T - T_{N-1});$$

wherein, $S_N$ denotes the first displacement inn the Nth target sub-range, $V_N$ denotes the calibration speed of the Nth target sub-range, $T_{N-1}$ denotes the start moment of the Nth target time region, and T denotes a current moment of the Nth target time region.

6. The magnetostrictive displacement sensor calibration method according to claim 5, wherein accumulating the first displacement with all sub-ranges before the target sub-range to obtain the displacement of the current moment is performed by a following formula:

$$S = S_N + SUM(L_{N-1});$$

wherein, S denotes the displacement of the current moment, $S_N$ denotes the first displacement on the Nth target sub-range, and $SUM(L_{N-1})$ denotes a sum of lengths of all sub-ranges before the Nth target sub-range.

7. A magnetostrictive displacement sensor calibration system, comprising a magnetostrictive displacement sensor, a microprocessor, a laser interferometer, an upper computer and a time converter;
wherein the upper computer is connected to the laser interferometer and the microprocessor, the magnetostrictive displacement sensor is connected to the time converter, and the time converter is connected to the microprocessor;
the laser interferometer is configured for performing displacement marking during range segmentation of the magnetostrictive displacement sensor;
the upper computer is configured for reading an amount of displacement marking of the laser interferometer to obtain each sub-range and writing each sub-range into the microprocessor;
the time converter is configured for marking a start moment and an end moment of each sub-range based on instructions to start timing sent by the microprocessor;
the microprocessor is configured for:
obtaining all sub-ranges after a range of the magnetostrictive displacement sensor is segmented;
obtaining the start moment and the end moment of each sub-range to obtain a time region of each sub-range;
determining a target time region of a current moment, and calculating to obtain a calibration speed of a target sub-range based on a target start moment, a target end moment and a target sub-range of the target time region;
calculating a first displacement on the target sub-range based on the calibration speed, the current moment and the target start moment; and
accumulating the first displacement with all sub-ranges before the target sub-range to obtain a displacement of the current moment;
wherein obtaining all the sub-ranges after the range of the magnetostrictive displacement sensor is segmented comprises:
determining a start position of the magnetostrictive displacement sensor for segmenting the range of the magnetostrictive displacement sensor;
predetermining a displacement length of each sub-range;
using the start position as a start point to start to move a non-contact magnetic ring of the magnetostrictive displacement sensor; and
performing displacement marking when a movement distance of the non-contact magnetic ring reaches the displacement length of each sub-range, to segment the range of the magnetostrictive displacement sensor, to obtain each sub-range by marking.

8. A calibration device, comprising a memory and a processor, wherein the memory stores a computer program, and the processor, when executing the computer program, implements the method according to claim 1.

9. A computer-readable storage medium, on which computer-readable instructions are stored, wherein the computer-readable instructions, when executed by a processor of a computer, cause the computer to implement the method according to claim 1.

10. The magnetostrictive displacement sensor calibration method according to claim 1, wherein the magnetostrictive displacement sensor comprises a waveguide wire, a measuring rod, an electronic warehouse, and a non-contact magnetic ring with permanent magnets inside provided on the measuring rod.

11. The magnetostrictive displacement sensor calibration system according to claim 7, wherein the microprocessor is connected to the magnetostrictive displacement sensor, the microprocessor is configured for obtaining sub-ranges after the range of the magnetostrictive displacement sensor is segmented, and the upper computer is configured for writing the sub-ranges into the microprocessor.

12. The magnetostrictive displacement sensor calibration system according to claim 11, wherein the laser interferometer is configured for measuring a displacement length of each sub-range, or determine a movement distance to be controlled of each small segment of the non-contact magnetic ring;

the upper computer is configured for reading data from the laser interferometer to obtain each sub-range after the range of the magnetostrictive displacement sensor is segmented, and marking and writing the corresponding displacement of each sub-range to the microprocessor, for the microprocessor obtaining the marked sub-ranges.

13. The magnetostrictive displacement sensor calibration system according to claim 7, wherein the microprocessor is further configured for:

taking a moment when moving from the start position as the start moment of each sub-range; and performing moment marking when the movement distance of the non-contact magnetic ring reaches the displacement length of each sub-range to obtain the start moment and end moment of each sub-range, wherein a start moment of a current sub-range is an end moment of an adjacent previous sub-range.

14. The magnetostrictive displacement sensor calibration system according to claim 7, wherein the microprocessor is further configured for:

obtaining a moment when the non-contact magnetic ring stops to move as the current moment; and comparing the current moment with the start moment and the end moment of each marked sub-range to determine the target time region of the current moment.

15. The magnetostrictive displacement sensor calibration system according to claim 7, wherein calculating to the calibration speed of the target sub-range based on the target start moment, the target end moment and the target sub-range of the target time region is performed by a following formula:

$$V_N = \frac{L_N}{T_N - T_{N-1}};$$

wherein, $V_N$ denotes a calibration speed of a Nth target time region, $L_N$ denotes a displacement length of a Nth target sub-range, $T_N$ denotes an end moment of the Nth target time region, and $T_{N-1}$ denotes a start moment of the Nth target time region.

16. The magnetostrictive displacement sensor calibration system according to claim 15, wherein calculating the first displacement on the target sub-range based on the calibration speed, the current moment and the target start moment is performed by a following formula:

$$S_N = V_N * (T - T_{N-1});$$

wherein, $S_N$ denotes the first displacement inn the Nth target sub-range, $V_N$ denotes the calibration speed of the Nth target sub-range, $T_{N-1}$ denotes the start moment of the Nth target time region, and T denotes a current moment of the Nth target time region.

17. The magnetostrictive displacement sensor calibration system according to claim 16, wherein accumulating the first displacement with all sub-ranges before the target sub-range to obtain the displacement of the current moment is performed by a following formula:

$$S = S_N + \text{SUM}(L_{N-1});$$

wherein, S denotes the displacement of the current moment, $S_N$ denotes the first displacement on the Nth target sub-range, and $\text{SUM}(L_{N-1})$ denotes a sum of lengths of all sub-ranges before the Nth target sub-range.

* * * * *